United States Patent
Riley et al.

(10) Patent No.: US 8,864,949 B2
(45) Date of Patent: Oct. 21, 2014

(54) SYSTEM FOR DECONTAMINATING WATER AND GENERATING WATER VAPOR

(71) Applicant: Verno Holdings, LLC, Las Vegas, NV (US)

(72) Inventors: John D. Riley, Santa Maria, CA (US); Dana L. Johnson, Ventura, CA (US)

(73) Assignee: Verno Holdings, LLC, Las Vegas, NV (US)

( * ) Notice: Subject to any disclaimer, the term of this patent is extended or adjusted under 35 U.S.C. 154(b) by 0 days.

(21) Appl. No.: 13/744,778

(22) Filed: Jan. 18, 2013

(65) Prior Publication Data

US 2013/0127074 A1    May 23, 2013

Related U.S. Application Data

(62) Division of application No. 12/488,750, filed on Jun. 22, 2009.

(60) Provisional application No. 61/074,743, filed on Jun. 23, 2008.

(51) Int. Cl.
| | |
|---|---|
| C02F 1/04 | (2006.01) |
| C02F 103/00 | (2006.01) |
| B01D 3/42 | (2006.01) |
| F01K 17/00 | (2006.01) |
| F22B 3/06 | (2006.01) |
| B01D 1/22 | (2006.01) |
| C02F 1/08 | (2006.01) |
| C02F 1/18 | (2006.01) |
| C02F 103/08 | (2006.01) |

(52) U.S. Cl.
CPC . *C02F 1/043* (2013.01); *C02F 1/18* (2013.01); *C02F 2209/02* (2013.01); B01D 1/225 (2013.01); F22B 3/06 (2013.01); *C02F 2209/42* (2013.01); *C02F 1/08* (2013.01); *C02F 2103/08* (2013.01); *C02F 1/048* (2013.01); *Y10S 159/901* (2013.01); *Y10S 159/39* (2013.01)
USPC ............... 202/238; 60/679; 159/6.3; 159/44; 159/901; 159/DIG. 39; 202/160; 202/182; 202/197; 202/202; 210/143; 210/167.01; 261/109; 261/110; 261/113

(58) Field of Classification Search
USPC ....... 60/697; 159/6.3, 25.1, 44, 901, DIG. 39; 202/160, 182, 197, 202, 238; 210/143, 210/167.01; 261/109, 110, 113
See application file for complete search history.

(56) References Cited

U.S. PATENT DOCUMENTS

| | | | | |
|---|---|---|---|---|
| 2,118,803 | A | * | 5/1938 | Bowen ........................ 159/4.2 |
| 2,747,002 | A | * | 5/1956 | Walker et al. ................ 585/15 |

(Continued)

FOREIGN PATENT DOCUMENTS

DE    4106112 A1    9/1992

*Primary Examiner* — Virginia Manoharan
(74) *Attorney, Agent, or Firm* — Kelly & Kelley, LLP

(57) ABSTRACT

A system and method for decontaminating water and generating water vapor includes introducing contaminated water in to a vessel. The water is moved through a series of rotating trays alternately separated by stationary baffles so as to swirl and heat the water to effect the vaporization thereof to produce a vapor having at least some of the contaminants separated therefrom. The vapor is removed from the vessel for condensing apart from the separated contaminants and the remaining water. The vapor may be passed through a turbine connected to an electric generator. Sensors in a controller may be employed to adjust the speed of rotation of the trays or water input into the vessel in response to the sensed conditions. The treated water may be recirculated and reprocessed through the vessel to increase the purification thereof.

31 Claims, 8 Drawing Sheets

(56) References Cited

U.S. PATENT DOCUMENTS

| | | | |
|---|---|---|---|
| 3,373,089 A * | 3/1968 | Vautrain et al. ................ 203/40 |
| 3,613,368 A | 10/1971 | Doerner |
| 3,717,554 A | 2/1973 | Ruthrof |
| 4,287,026 A | 9/1981 | Wallace |
| 4,313,784 A | 2/1982 | Haley |
| 4,891,140 A | 1/1990 | Burke, Jr. |
| 4,959,122 A | 9/1990 | Kurematsu et al. |
| 5,045,155 A | 9/1991 | Ramsland |
| 5,118,388 A | 6/1992 | Aboul-Nasr |
| 5,396,884 A | 3/1995 | Bagwell et al. |
| 5,645,693 A | 7/1997 | Gode |
| 5,810,975 A | 9/1998 | Bourdel |
| 5,888,453 A | 3/1999 | Luker |
| 6,080,218 A * | 6/2000 | Pirkle ......................... 55/385.3 |
| 6,689,251 B2 | 2/2004 | Zebuhr |
| 7,150,807 B2 | 12/2006 | Genser |
| 7,498,175 B2 | 3/2009 | Cole |
| 7,540,944 B2 | 6/2009 | Bitterly et al. |
| 7,749,360 B2 | 7/2010 | Waldron |
| 2007/0193872 A1 | 8/2007 | Garcia et al. |
| 2007/0235317 A1 | 10/2007 | Waldron |
| 2008/0210384 A1 | 9/2008 | Guthrie |
| 2009/0139192 A1 * | 6/2009 | Sams et al. ..................... 55/418 |
| 2010/0116756 A1 | 5/2010 | Fletcher |

\* cited by examiner

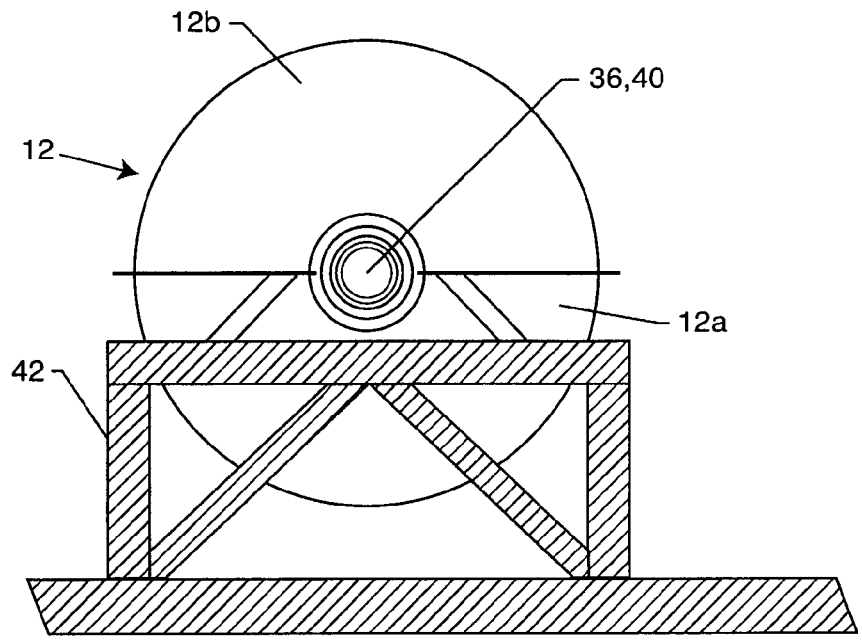
FIG. 4
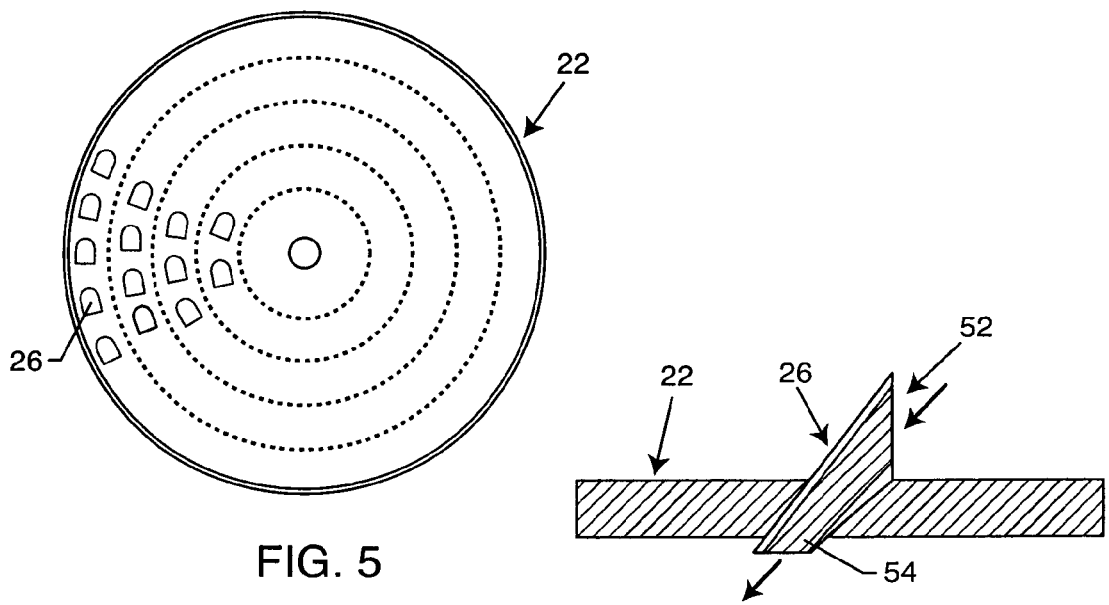
FIG. 5
FIG. 6

SYSTEM FOR DECONTAMINATING WATER AND GENERATING WATER VAPOR

This application is a division of U.S. application Ser. No. 12/488,750, filed Jun. 22, 2009 (now U.S. Pat. No. 8,526, 791), which claims priority to Provisional Application Ser. No. 61/074,743, filed Jun. 23, 2008.

BACKGROUND OF THE INVENTION

The present invention relates to a system for decontaminating water and generating water vapor. More particularly, the present invention relates to an improved method that utilizes a series of sensors and a control system to vaporize water, remove dissolved solids and maximize recovery of potable water from contaminated water via a horizontal water processing vessel.

Desalinization (also desalination or desalinisation) refers to one of many processes for removing excess salt, minerals and other natural or unnatural contaminants from water. Historically, desalinization converted sea water into drinking water onboard ships. Modern desalinization processes are still used on ships and submarines to ensure a constant drinking water supply for the crew. But, desalinization is increasingly being used in arid regions having scarce fresh water resources. In these regions, salt water from the ocean is desalinated to fresh water suitable for consumption (i.e. potable) or for irrigation. The highly concentrated waste product from the desalinization process is commonly referred to as brine, with salt (NaCl) being a typical major by-product. Most modern interest in desalinization focuses on developing cost-effective processes for providing fresh water for use in arid regions where fresh water availability is limited.

Large-scale desalinization is typically costly and generally requires large amounts of energy and an expensive infrastructure. For example, the world's largest desalinization plant primarily uses multi-stage flash distillation and can produce 300 million cubic meters ($m^3$) of water per year. The largest desalinization plant in the United States desalinates 25 million gallons (95,000 $m^3$) of water per day. Worldwide, approximately 13,000 desalinization plants produce more than 12 billion gallons (45 million $m^3$) of water per day. Thus, there is a constant need in the art for improving desalinization methods, namely lowering costs and improving efficiency of the related systems.

Desalinization may be performed by many different processes. For example, several processes use simple evaporation-based desalinization methods such as multiple-effect evaporation (MED or simply ME), vapor-compression evaporation (VC) and evaporation-condensation. In general, evaporation-condensation is a natural desalinization process performed by nature during the hydrologic cycle. In the hydrologic cycle, water evaporates into the atmosphere from sources such as lakes, oceans and streams. Evaporated water then contacts cooler air and forms dew or rain. The resultant water is generally free from impurities. The hydrologic process can be replicated artificially using a series of evaporation-condensation processes. In basic operation, salt water is heated to evaporation. Salt and other impurities dissolve out from the water and are left behind during the evaporation stage. The evaporated water is later condensed, collected and stored as fresh water. Over the years, the evaporation-condensation system has been greatly improved, especially with the advent of more efficient technology facilitating the process. But, these systems still require significant energy input to evaporate the water. An alternative evaporation-based desalinization method includes multi-stage flash distillation, as briefly described above. Multi-stage flash distillation uses vacuum distillation. Vacuum distillation is a process of boiling water at less than atmospheric pressure by creating a vacuum within the evaporation chamber. Hence, vacuum distillation operates at a much lower temperature than MED or VC and therefore requires less energy to evaporate the water to separate the contaminants therefrom. This process is particularly desirable in view of rising energy costs.

Alternative desalinization methods may include membrane-based processes such as reverse osmosis (RO), electrodialisys reversal (EDR), nanofiltration (NF), forward osmosis (FO) and membrane distillation (MD). Of these desalinization processes, reverse osmosis is the most widely used. Reverse osmosis uses semi-permeable membranes and pressure to separate salt and other impurities from water. Reverse osmosis membranes are considered selective. That is, the membrane is highly permeable to water molecules while highly impermeable to salt and other contaminants dissolved therein. The membranes themselves are stored in expensive and highly pressurized containers. The containers arrange the membranes to maximize surface area and salt water flow rate therethrough. Conventional-osmosis desalinization systems typically use one of two techniques for developing high pressure within the system: (1) high-pressure pumps; or (2) centrifuges. A high-pressure pump helps filter salt water through the membrane. The pressure in the system varies according to the pump settings and osmotic pressure of the salt water. Osmotic pressure depends on the temperature of the solution and the concentration of salt dissolved therein. Alternatively, centrifuges are typically more efficient, but are more difficult to implement. The centrifuge spins the solution at high rates to separate materials of varying densities within the solution. In combination with a membrane, suspended salts and other contaminants are subject to constant radial acceleration along the length of the membrane. One common problem with reverse osmosis in general is the removal of suspended salt and clogging of the membrane over time.

Operating expenses of reverse osmosis water desalinization plants are primarily determined by the energy costs required to drive the high-pressure pump or centrifuge. A hydraulic energy recovery system may be integrated into the reverse osmosis system to combat rising energy costs associated with already energy intensive processes. This involves recovering part of the input energy. For example, turbines are particularly capable of recovering energy in systems that require high operating pressures and large volumes of salt water. The turbine recovers energy during a hydraulic pressure drop. Thus, energy is recovered in a reverse osmosis system based on pressure differentials between opposite sides of the membrane. The pressure on the salt water side is much higher than the pressure on the desalinated water side. The pressure drop produces considerable hydraulic energy recoverable by the turbine. Thus, the energy produced between high pressure and low pressure sections of the reverse osmosis membrane is harnessed and not completely wasted. Recovered energy may be used to drive any of the system components, including the high-pressure pump or centrifuge. Turbines help reduce overall energy expenditures to perform desalinization.

In general, reverse osmosis systems typically consume less energy than thermal distillation and is, therefore, more cost effective. While reverse osmosis works well with somewhat brackish water solutions, reverse osmosis may become overloaded and inefficient when used with heavily salted solutions, such as ocean salt water. Other, less efficient desalinization methods may include ionic exchange, freezing, geothermal desalinization, solar humidification (HDH or MEH), methane hydrate crystallization, high-grade water recycling or RF induced hyperthermia. Regardless of the process, desalinization remains energy intensive. Future costs and economic feasibility continue to depend on both the price of desalinization technology and the costs of the energy needed to operate the system.

In another alternative method of desalinization, U.S. Pat. No. 4,891,140 to Burke, Jr. discloses a method of separating and removing dissolved minerals and organic material from water by destructive distillation. Here, water is heated to a vapor under controlled pressure. Dissolved salt particles and other contaminants fall out of the solution as water evaporates. An integrated hydrocyclone centrifuge speeds up the separation process. The heated, high pressure clean water transfers energy back to the system through heat exchange and a hydraulic motor. Net energy use is therefore relatively lower than the aforementioned processes. In fact, net energy use is essentially equivalent to pump loss and heat loss from equipment operation. One particular advantage of this design is that there are no membranes to replace. This process removes chemicals and other matter that would otherwise damage or destroy membrane-based desalinization devices.

Another patent, U.S. Pat. No. 4,287,026 to Wallace, discloses a method and apparatus for removing salt and other minerals in the form of dissolved solids from salt and other brackish waters to produce potable water. Water is forced through several desalinization stages at high temperature and at high centrifugal velocities. Preferably, the interior components spin the water at speeds up to Mach 2 to efficiently separate and suspend dissolved salt and other dissolved solids from the vaporized water. The suspended salt and other minerals are centrifugally forced outward to be discharged separately from the water vapor. The separated and purified vapor or steam is then condensed back to potable water. The system requires significantly less operational energy than reverse osmosis and similar filtration systems to efficiently and economically purify water. One drawback of this design is that the rotating shaft is built into a vertical chamber. As a result, the rotating shaft sections are only solidly anchored to the base unit by a bearing and a bearing cap. At high rotational speeds (e.g. over Mach 1), vibrations cause excessive bearing shaft and seal failure. Another drawback is that a series of chambers are bolted together in housing sections. The perforated plates are coupled to these sections by an O-ring seal. The housing and O-ring seals tend to wear over time due to salt penetration because the multiple chambers and housing sections are connected via a plurality of nuts and bolts. In particular, the assembly of the Wallace design is particularly laborious. Maintenance is equally labor intensive as it takes significant time to disassemble each of the housing sections, including the O-rings, nuts and bolts. Of course, the device must be reassembled after the requisite maintenance is performed. Each housing section must be carefully put back together to ensure proper sealing therebetween. The system is also prone to a variety of torque and maintenance problems as the device ages, such as O-ring leakage. Moreover, the rotating shaft is connected to the power source by a gear drive, which contributes to the aforementioned reliability problems associated with the bearings, shafts and seals. The system also fails to disclose a means for regulating the speed of the rotating shaft sections according to the osmotic pressure of the salt water being desalinated. The static operation of the Wallace desalinization machine is therefore not as efficient as other modern desalinization devices.

Thus, there is a need in the art for an improved system that includes sensors for monitoring real-time system information and controls for adjusting the mechanical operation of the system to maximize decontamination of the water, such as desalinization of the water, and minimize energy consumption. Such a system should further incorporate multiple recycling cycles to increase the recovery of potable water from approximately eighty percent to between approximately ninety-six percent to ninety-nine percent, should incorporate a polymer aided recovery system to extract trace elements of residue compounds and should consume less energy than other desalinization systems known in the art. The present invention fulfills these needs and provides further related advantages.

SUMMARY OF THE INVENTION

The present invention is directed to a system for decontaminating water, such as desalinating water, and generating water vapor, including steam. The system includes an elongated vessel defining an inner chamber. The vessel is oriented generally horizontally. A water inlet is formed in the vessel for introducing water therein. A plurality of trays is disposed within the inner chamber in spaced relation to one another. The trays include scoops through which water and water vapor pass. The scoops preferably include an inlet of a first diameter and an outlet of a second smaller diameter. A plurality of baffles, typically apertured plates, are disposed between the trays. Each baffle has a plurality of apertures through which water and water vapor passes. Preferably, the apertures have an inlet of a first diameter and an outlet of a second smaller diameter. In one embodiment, at least one of the baffles includes a flow director extending from a front face thereof and configured to direct flow of the water and water vapor towards a periphery of the baffle.

A rotatable shaft passes through the baffles, and is attached to the tray so as to rotate the trays within the inner chamber, while the baffles remain stationary. A drive rotates the shaft. Typically, a layer or sleeve of low friction material, or bearings, is disposed between the baffles and the shaft.

A contaminant outlet is formed in the vessel and typically in fluid communication with a contaminant water tank. A water vapor outlet is also formed in the vessel and is in communication with a vapor recovery tank for condensing the vapor to liquid water. In one embodiment, at least one treated contaminated water tank is fluidly coupled to the vessel for reprocessing the contaminated water by passing the treated contaminated water through the system again.

In one embodiment, a controller is used to adjust the speed of rotation of the shaft or the water input into the vessel. At least one sensor is in communication with the controller. At least one sensor is configured to determine at least one of: 1) speed of rotation of the shaft or trays, 2) pressure of the inner chamber, 3) temperature of the water or water vapor, 4) water input rate, or 5) level of contaminated water to be processed.

In one embodiment, a turbine is connected to the water vapor outlet of the vessel and operably connected to an electric generator. The water is heated to at least a boiling temperature thereof so as to create steam, and the vapor and/or steam is passed through the turbine operably connected to the electric generator. A treated water return may be disposed between the turbine and the vessel water inlet.

In a particularly preferred embodiment, the system is attached to a portable framework, which may be transported via semi-trailer truck, ISO container, or the like.

In use, the method for decontaminating water and generating the water vapor comprises the steps of introducing a water having contaminants into the vessel. The water is moved through the series of rotating trays alternately separated by the stationary baffles so as to swirl and heat the water to effect the vaporization thereof to produce a vapor having at least some of the contaminants separated therefrom. Typically, the water is heated to at least one hundred degrees Fahrenheit, but less than two hundred twelve degrees Fahrenheit, if the system does not include a turbine and electric generator. Preferably, the temperature of the vapor is raised to a pasteurization temperature. This is done by rotating the trays to a speed where vapor temperature reaches the pasteurization temperature.

The vapor is removed from the vessel for condensing apart from the separated contaminants and remaining water. The water vapor is passed through a recovery tank having spaced apart members in a flow path of the vapor for condensing to liquid water.

In one embodiment, certain conditions are sensed, including at least one of: 1) water input into the vessel, 2) the speed of rotation of the trays, 3) pressure within the vessel, 4) temperature of the water or vapor, or 5) level of separated contaminants. The speed of rotation of the trays or water input into the vessel may be adjusted in response to the sensed conditions. The level of separated contaminants and water in a holding tank or concentration of contaminants in the treated water may also be sensed, and the separated contaminants and water be reprocessed by recirculating them through the vessel.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 4 is an end view of the horizontal water processing vessel attached to a portable framework, in accordance with the present invention;

FIG. 5 is a top view of a rotating tray having a plurality of scoops therein;

FIG. 6 is a cross-sectional view of a portion of the tray and a scoop thereof;

DETAILED DESCRIPTION OF THE PREFERRED EMBODIMENTS

Figure 1:
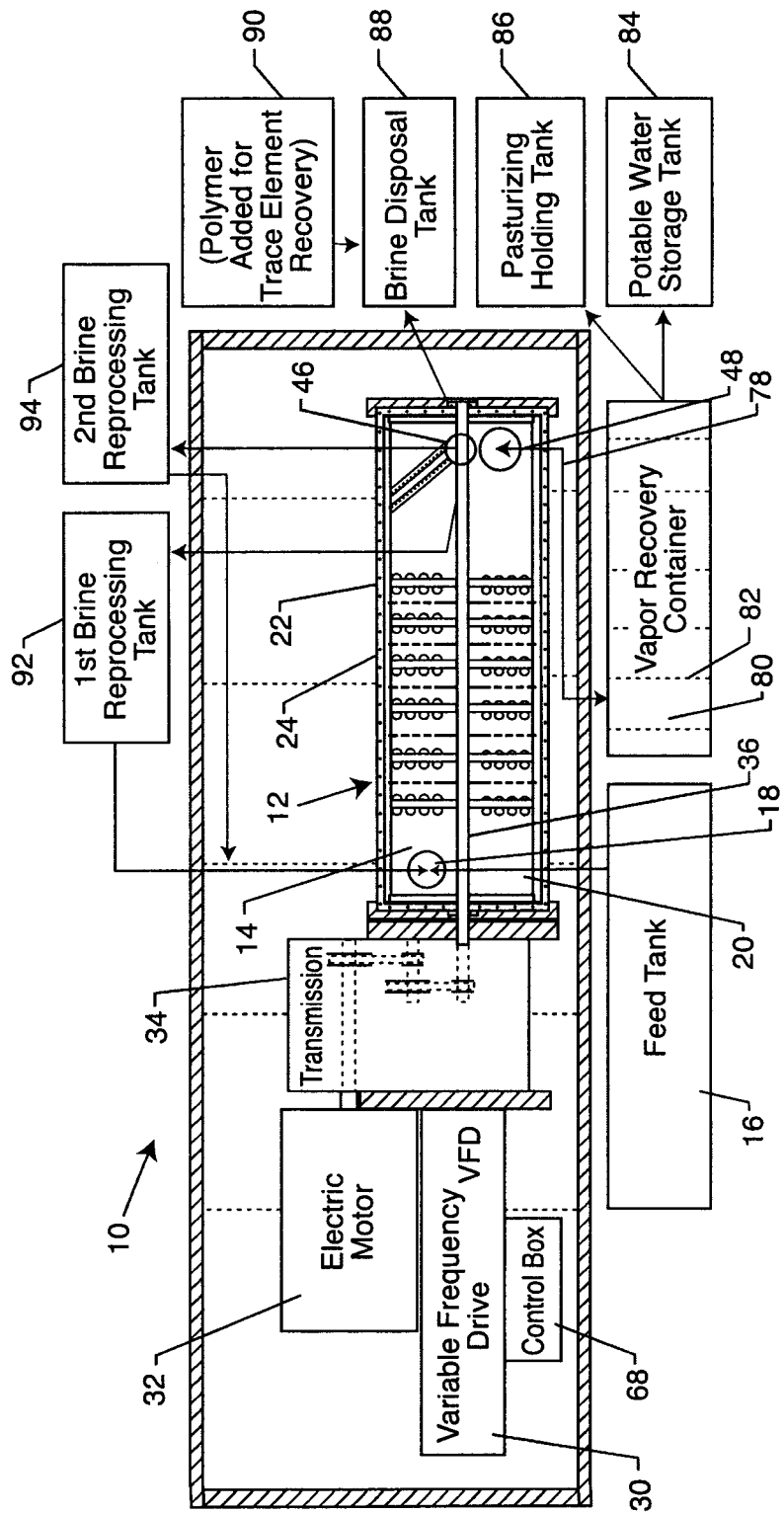
FIG. 1 is a top schematic, and partially sectioned, view of a system for decontaminating water and generating water vapor, in accordance with the present invention.

As shown in the drawings, for purposes of illustration, the present invention resides in a system and method for decontaminating water and generating water vapor. The method and system of the present invention is particularly suitable for desalinization of salt water, such as ocean or other brackish waters, and this preferred treatment will be used for exemplary purposes herein, although it will be understood by those skilled in the art that the system and method of the present invention could be used to decontaminate other water sources. Moreover, as will be more fully described herein, the system and method of the present invention can be used in association with relatively clean water to create water vapor, in the form of steam, which has a sufficient pressure and temperature so as to be passed through a turbine which is operably connected to an electric generator for the generation of electricity, or other steam heating applications.

Figure 2:
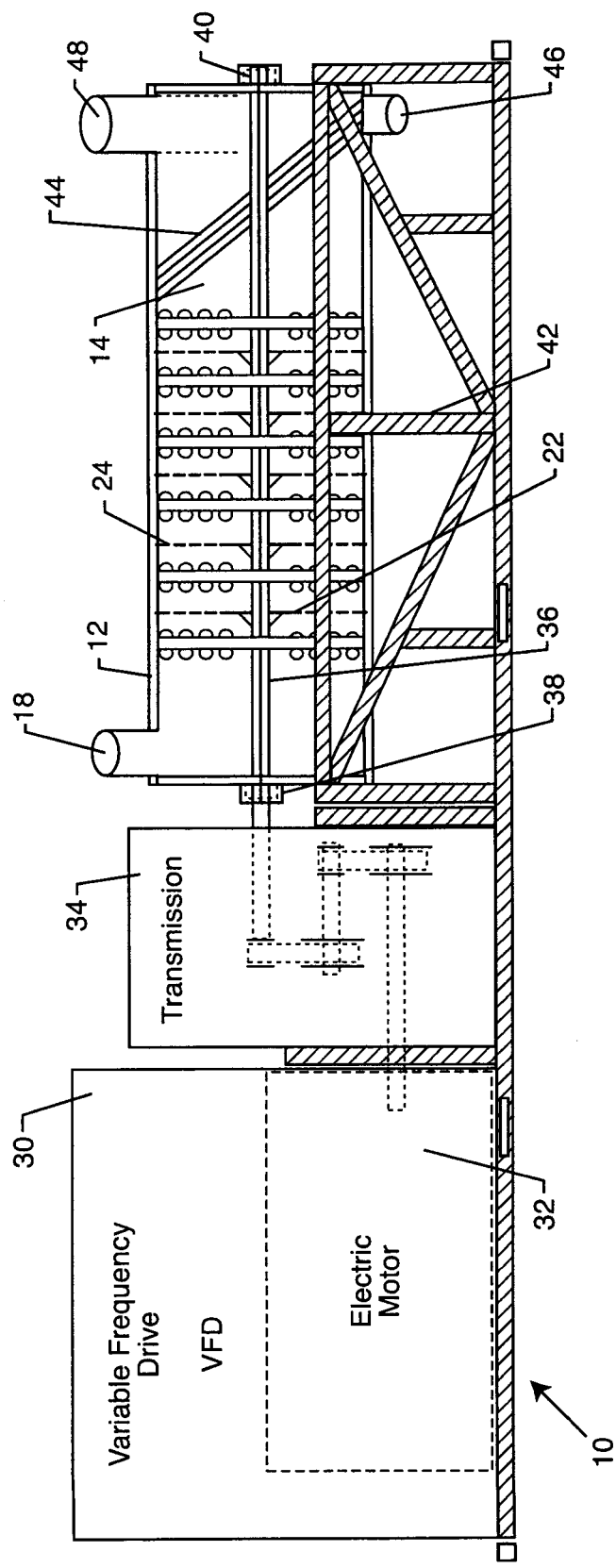
FIG. 2 is a side schematic, and partially sectioned, view of the system of FIG. 1.

With reference now to FIGS. 1 and 2, the system, generally referred to by the reference number 10, includes a water processing vessel or chamber 12 defining an inner chamber 14, wherein salt and other dissolved solids and contaminants are removed from the water to produce essentially mineral-free, potable water. In one embodiment, the processing vessel 12 receives contaminated water from a feed tank 16 through an inlet valve 18 via a feed tank tube 20. As described above, the source of water can be sea or ocean water, other brackish waters, or even water which is contaminated with other contaminants. Moreover, the present invention envisions supplying the contaminated water directly from the source, wherein the feed tank 16 may not necessarily be used.

Figure 3:
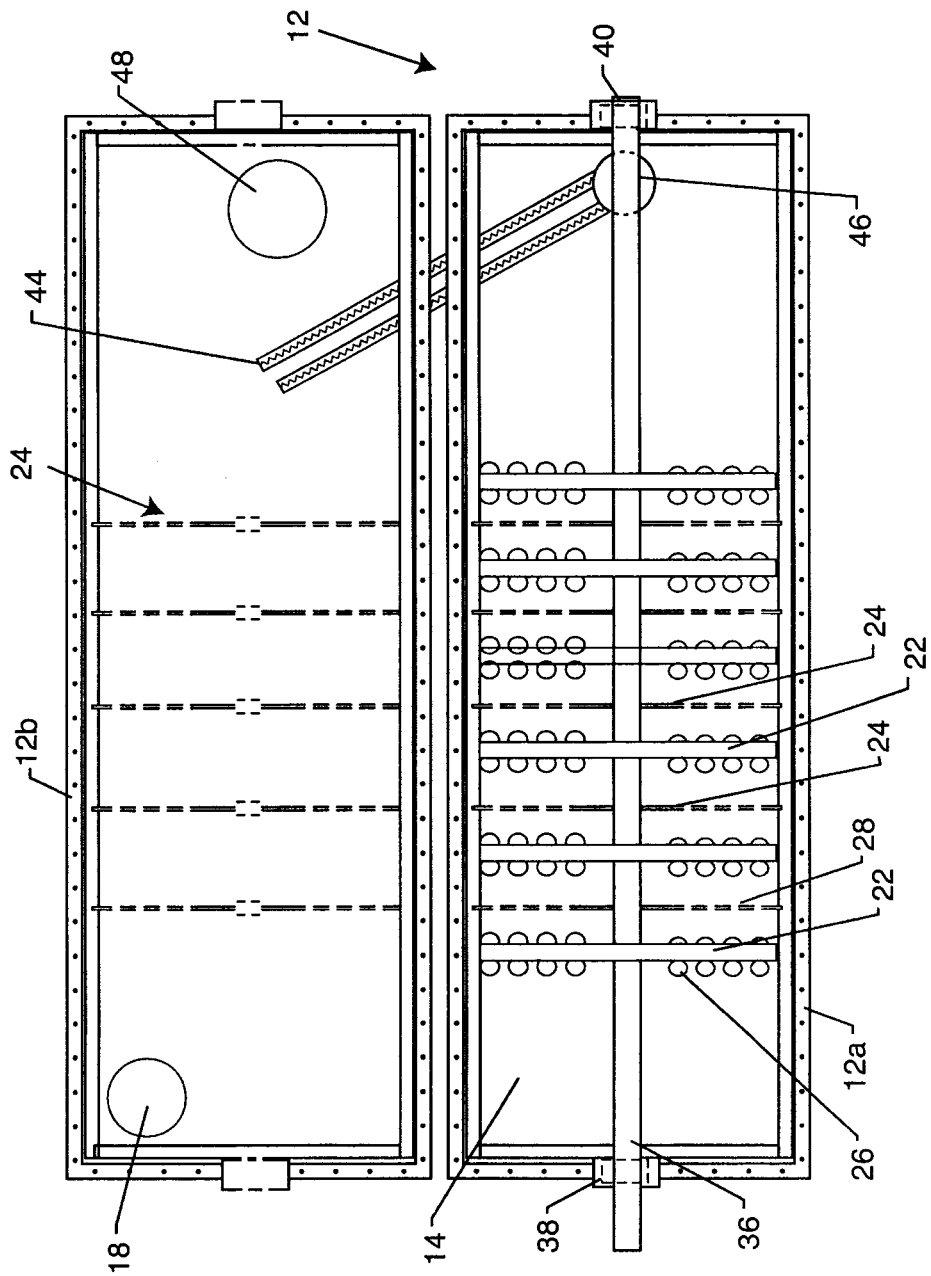
FIG. 3 is a top view illustrating the water processing vessel having an upper portion thereof opened.

With reference now to FIG. 3, in a particularly preferred embodiment, the vessel 12 is comprised of a lower shell and an upper shell portion 12b such that the lower and upper shell portions 12a and 12b can be opened or removed relative to one another so as to access the contents within the inner chamber 14 of the vessel 12. The water processing vessel 12 includes, within the inner chamber 14 a plurality of rotatable trays 22 spaced apart from one another and having a baffle 24 disposed between the trays 22. As will be more fully explained herein, the rotatable trays 22 include a plurality of scoops 26 formed therethrough and the baffles 24 typically comprise plates having a plurality of apertures 28 formed therethrough. The baffles 24 are fixed to the vessel 12 so as to be stationary. The baffles 24 may comprise a lower portion disposed in the lower shell 12a of the vessel and an upper portion attached to and disposed in the upper shell 12b of the vessel 12 and designed to form a single baffle when the lower and upper shells 12a and 12b of the vessel 12 are in engagement with one another and closed, or each baffle 24 can comprise a single piece which is attached to either the lower shell 12a or the upper shell 12b and yet remain generally stationary as the water and water vapor is passed therethrough.

A variable frequency drive 30 regulates the speed at which electric motor 32 drives a transmission 34 and a corresponding shaft 36. The shaft 36 is rotatably coupled to bearings or the like, typically Schmitt couplers or ceramic bearings 38 and 40 at generally opposite ends of the vessel 12. The shaft 36 extends through the trays 22 and baffles 24 such that only the trays 22 are rotated by the shaft. That is, the trays 22 are coupled to the shaft 36. Bearings, or a low-friction material, such as a layer or sleeve of Teflon is disposed between the rotating shaft 36 and the aperture plate baffle 24 to reduce friction therebetween, yet stabilize and support the spinning shaft 36.

As can be seen from the drawings, the water processing vessel 12 is oriented generally horizontally. This is in contrast to the Wallace '026 device wherein the water processing chamber was oriented generally vertically, and the top of the rotating shaft was secured by a bearing and a bearing cap, which supported the chamber itself. As a result, the rotating shaft sections were only solidly anchored to the base of the unit. At high rotational operating speeds, vibrations within the system cause excessive bearing, shaft and seal failure. In contrast, horizontally mounting the water processing vessel 12 to a frame structure 42 distributes the rotational load along the length of the vessel 12 and reduces vibrations, such as harmonic vibrations, that could otherwise cause excessive bearing, shaft and seal failures. Moreover, mounting the vessel 12 to the frame structure 42 enhances the portability of the system 10, as will be more fully described herein. Supporting the very rapidly rotating shaft 36 through each baffle 24 further stabilizes the shaft and system and reduces vibrations and damage caused thereby.

As mentioned above, the shaft 36, and trays 22 are rotated at a very high speed, such as Mach 2. This moves the water through the scoops 26 of the trays 22, which swirls and heats the water such that a water vapor is formed, and the contaminants, salts, and other dissolved solids are left behind and fall out of the water vapor. The water and water vapor is then passed through the apertures 28 of the baffles 24 before being processed again through the next rotating tray 22 with scoops 26. As the water and water vapor passes through each sub-chamber of the vessel 12, the temperature of the water vapor is increased such that additional water vapor is created and leaves the salts, dissolved solids, and other contaminants behind in the remaining water. The centrifugal forces on the water and contaminants force it to the wall of the inner chamber 14 and into a set of channels 44 which direct the contaminants and non-vaporized water to an outlet 46. The water vapor which is generated passes through a water vapor outlet 48 formed in the vessel 12. Thus, the water vapor and the contaminants and remaining water are separated from one another.

As mentioned above, the trays 22 are rotated by the shaft 36. The shaft 36 is supported within the interior of the water processing vessel 12 by a plurality of bearings, as mentioned above. The bearings are typically either steel or made from ceramic materials. Prior art desalinization systems incorporate standard roller bearings which would fail under high rotational speeds and high temperatures. Thus, desalinization systems known in the prior art had high failure rates associated with standard roller bearings. In the present invention, the sealed steel ball bearings or ceramic bearings 38 and 40 are more durable than standard roller bearings and fail less often under high rotational speeds and temperatures. Moreover, the shaft 36 is intermittently supported by the low friction materials, such as Teflon sleeves or bearings 50 disposed between the baffle plate 24 and the shaft 36. This further ensures even distribution of weight and forces on the shaft 36 and improves the operation and longevity of the system.

With particular reference now to FIGS. 5 and 6, an exemplary tray 22 is shown, having a plurality of scoops 26 formed therethrough. Although fourteen scoops 26 are illustrated in FIG. 5, it will be appreciated that the number may vary and can be several dozen in a single tray 22, thus the dotted line represents multiple scoops of a variety of numbers.

FIG. 6 is a cross-sectional view of the tray 22 and the scoop 26 formed therein. In a particularly preferred embodiment, the scoops 26 are tapered such that a diameter of an inlet 52 thereof is greater than the diameter of an outlet 54 thereof. The tapered scoop 26 is essentially a tube that has the vertical opening or inlet 52 substantially perpendicular to the horizontal surface of the rotating tray base 22. Water and vapor accelerates through the tapered scoop 26 because the tapered scoop has a larger volume at the entrance 52 thereof and a smaller volume at the exit or outlet 54 thereof. The change in volume from the inlet to the outlet of the tapered scoop 26 causes an increase in velocity due to the Venturi effect. As a result, the water and water vapor is further agitated, increases in temperature and increases in velocity. This further enables separation of the contaminants from within the water vapor. The tapered scoop 26 may be attached to the rotating tray 22 by any means known in the art.

Once again, it will be appreciated that there will be more or less tapered scoops 26 distributed in the entire area of the rotating tray 22, the particular number and size of the scoops 26 will vary depending upon the operating conditions of the system 10 of the present invention. Moreover, the angle of the scoop 26, illustrated as approximately forty-five degrees in FIG. 6, can be varied from tray to tray 22. That is, by increasing the angle of the spinning scoop, such as by twenty-five degrees to thirty-one degrees to thirty-six degrees on the subsequent tray, to forty degrees, forty-five degrees on a next tray, etc. the increase in angle of the scoop 26 of the spinning tray 22 accommodates increases in pressure of the water vapor which builds up as the water vapor passes through the vessel 12. The increase in angle can also be used to further agitate and create water vapor, and increase the pressure of the water vapor, which may be used in a steam turbine, as will be more fully described herein.

Figure 7:
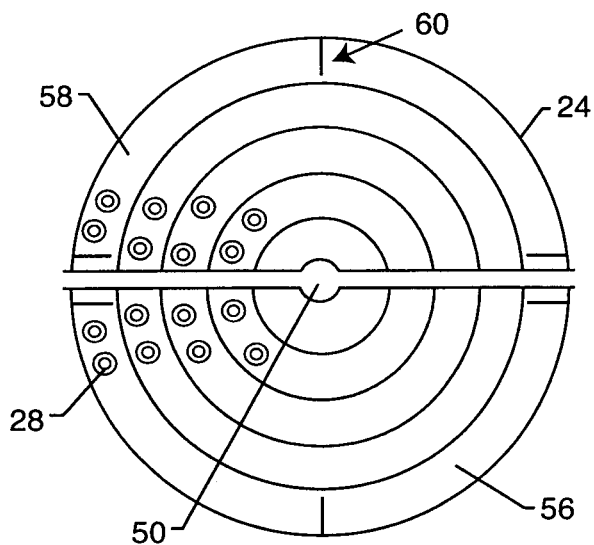
FIG. 7 is a top view of a baffle, used in accordance with the present invention.
Figure 8:
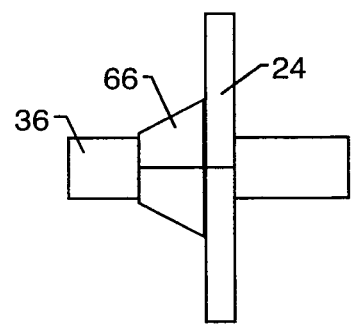
FIG. 8 is a side view of a baffle having a water director placed in front thereof.
Figure 9:
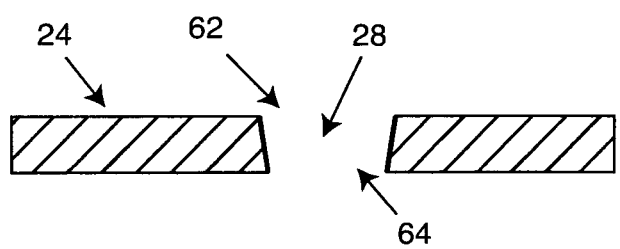
FIG. 9 is a cross-sectional view of a portion of the baffle, illustrating a tapered aperture thereof.

With reference now to FIGS. 7-9, a baffle 24, in the form of an apertured plate, is shown in FIG. 7. In this case, the baffle 24 is formed as a first plate member 56 and a second plate member 58 which are connected by connectors 60 to the inner wall of the vessel 12. The connectors 60 can comprise bolts, rods, or any other connecting means which is adequate. Alternatively, as described above, the baffle 24 can be formed as a single unit connected to either the upper or the lower vessel shell 12a and 12b. When formed as dual plate members 56 and 58, preferably the plate members 56 and 58 inter-engage with one another when the vessel 12 is closed so as to form a single baffle 24.

As described above, a plurality of apertures 28 are formed through the baffle plate 24. FIG. 9 is a cross-sectional view of one such aperture 28. Similar to the tray described above, the aperture preferably includes an inlet 62 having a diameter which is greater than an outlet 64 thereof, such that the aperture 28 is tapered which will increase the pressure and velocity of the water and water vapor which passes therethrough, further increasing the temperature and creating additional vapor from the water. Similar to the tray 22 described above, apertures 28 may be formed in the entire baffle plate, as represented by the series of dashed lines. The particular number and size of the apertures 28 may vary depending upon the operating conditions of the system 10.

With reference now to FIG. 8, the shaft 36 is illustrated extending through the baffle plate 24. In one embodiment, a cone-shaped water director 66 is positioned in front of the baffle 24. For example, the director 66 may have a forty-five degree angle to deflect the remaining water and vapor from the shaft 36 and towards the periphery or outer edge of the baffle plate 24 for improved vaporization and higher percentage recovery of potable water.

Referring again to FIGS. 3 and 4, as mentioned above, in a particularly preferred embodiment the vessel 12 is formed into two shells or sections 12a and 12b. This enables rapid inspection and replacement of vessel components, as necessary. Preferably, the wall of the inner chamber 14, and any other components such as the trays 22, baffle plates 24, shaft 36, etc. are treated with Melonite, or other friction reducing and corrosion resistant substance. Of course, these components can be comprised of materials which are corrosion resistant and have a low friction coefficient, such as polished stainless steel or the like. The lower and upper sections 12a and 12b of the vessel 12 are preferably interconnected such that when closed they are substantially air and water tight. Moreover, the closed vessel 12 needs to be able to withstand high temperatures and pressures due to the water vaporization therein during operation of the system 10.

Figure 10:
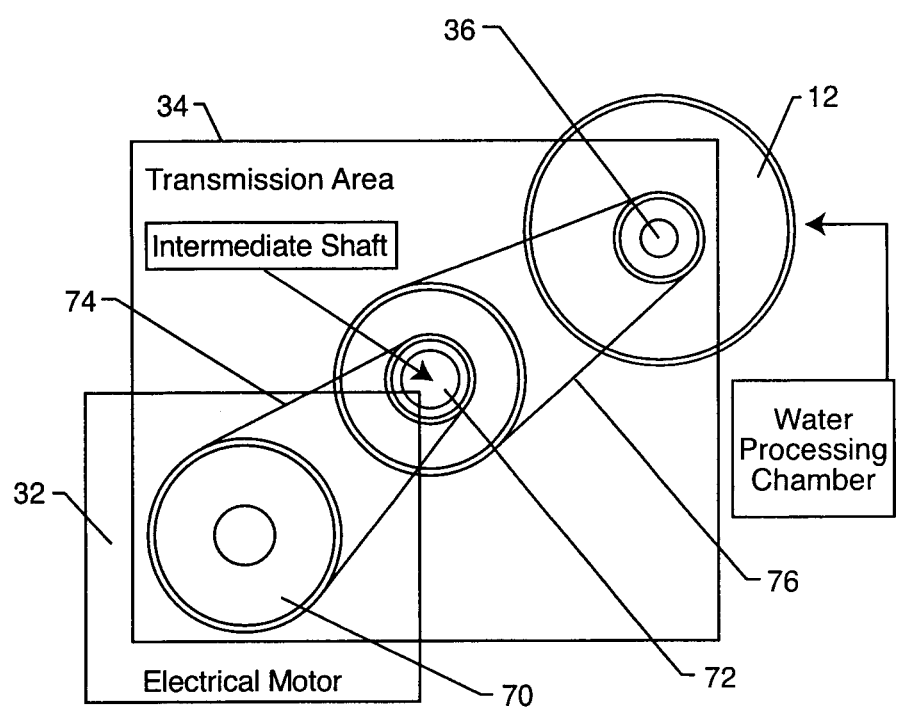
FIG. 10 is a schematic illustrating the electric motor coupled to the transmission and then coupled to the shaft of the water processing vessel, in accordance with the present invention.

With reference now to FIGS. 1, 2 and 10, typically a transmission 34 interconnects the electric motor 32 and the drive shaft 36. The speed of the transmission 34 is set by the variable frequency drive 30. The variable frequency drive 30 is primarily regulated by a computerized controller 68, as will be more fully described herein. With particular reference to FIG. 10, the shaft 70 of the motor is connected to an intermediate shaft 72 by a belt 74. The intermediate shaft 72 is connected to the shaft by another belt 76. The high-speed industrial belt and pulley system shown in FIG. 10 drives the shaft 36 inside the water processing vessel 12. As shown, a plurality of belts 74 and 76 and a set of intermediate shafts 72 increase the rotational output speed at the shaft 36 by a multiple of the rotational input speed applied by the electric motor 32 on the electric motor driveshaft 70. Of course, the ratio of rotational input speed to rotational output speed can be changed by changing the relative rotational velocities of the belts 74 and 76 and corresponding intermediate shafts 72. By coupling the electric motor driveshaft 70 to the shaft 36 via belts 74 and 76 and intermediate shaft 72, and adding a Schmitt coupler on the shaft 36 between the transmission 34 and the chamber 12, the present invention is able to avoid the vibrational and reliability problems that plague other prior art desalinization systems.

With reference again to FIG. 1, as mentioned above, the water vapor is directed through a water vapor outlet 48 of the vessel 12. The water vapor travels through a recovery tube 78 to a vapor recovery container or tank 80. The water vapor then condenses and coalesces into liquid water within the vapor recovery tank 80. To facilitate this, in one embodiment, a plurality of spaced apart members 82, such as in the form of louvers, are positioned in the flow pathway of the water vapor such that the water vapor can coalesce and condense on the louvers and become liquid water. The liquid water is then moved to a potable water storage tank 84 or a pasteurizing and holding tank 86. If the water and water vapor in the vessel 12 is heated to the necessary temperature for pasteurization, so as to kill harmful microorganisms, zebra mussel larvae, and other harmful organisms, the liquid water may be held in holding tank 86.

In a particularly preferred embodiment, when the main goal of the system 10 is to remove contaminants from the contaminated water, such as salt water, so as to have potable water, the temperature of the water vapor is heated between one hundred degrees Fahrenheit and less than two hundred twelve degrees Fahrenheit. Even more preferably, the water vapor is heated to between one hundred forty degrees Fahrenheit and one hundred seventy degrees Fahrenheit for pasteurization purposes. However, the water vapor temperature is kept to a minimum, and preferably less than two hundred twelve degrees Fahrenheit such that the water does not boil and become steam, which is more difficult to condense and coalesce from water vapor to liquid water. Instead, the water is boiled and the water vapor temperature above two hundred twelve degrees Fahrenheit preferably only in instances where steam generation is desirable for heating, electricity generating, etc. purposes as will be more fully described herein. This enables the present invention to both pasteurize the water vapor and condense and coalesce the water vapor into liquid water without complex refrigeration or condensing systems, which often require additional electricity and energy.

In one embodiment, the contaminated water, referred to as brine in desalinization processes, is collected at outlet 46 and moved to a brine disposal tank 88. As shown in FIG. 1, polymers or other chemistry may be added to the brine to recover trace elements, etc. Moreover, the salt from the brine may be processed and used for various purposes, including generating table salt.

In one embodiment of the present invention, the treated contaminated water is reprocessed by recycling the contaminants and remaining water through the system 10 again. This may be done multiple times such that the potable water extracted from the contaminated water increases, such as up to ninety-nine percent. This may be done by directing the contaminants and waste water from the outlet 46 to a first brine, or contaminant, reprocessing tank 92. The remaining waste water, in the form of brine or other contaminants, is then reintroduced through inlet 18 of the vessel 12 and reprocessed and recirculated through the vessel 12, as described above. Additional potable water will be extracted in the form of water vapor for condensing and collection in the vapor recovery tank 80. The remaining contaminants and wastewater are then directed to a second brine or contaminant reprocessing tank 94. The concentration of contaminants or brine will be much higher in this reprocessing tank. Once a sufficient level of wastewater or brine has been accumulated in the processing tank 94, this contaminated water is then passed through the inlet 18 and circulated and processed through the system 10, as described above. Extracted potable water vapor is removed at outlet 48 and turned into liquid water in the vapor recovery tank 80, as described above. The resulting contaminants and wastewater can then be placed into yet another reprocessing tank, or into the brine disposal tank 88. It is anticipated that an initial pass-through of seawater will yield, for example, eighty percent to ninety percent potable water. The first reprocessing will yield an additional amount of potable water, such that the total extracted potable water is between ninety percent and ninety-five percent. Passing the brine and remaining water through the system again can yield up to ninety-nine percent recovery of potable water, by recycling the brine at little to no increase in unit cost. Moreover, this reduces the volume of the brine or contaminants, which can facilitate trace element recovery and/or reduce the disposal costs thereof.

Figure 11:
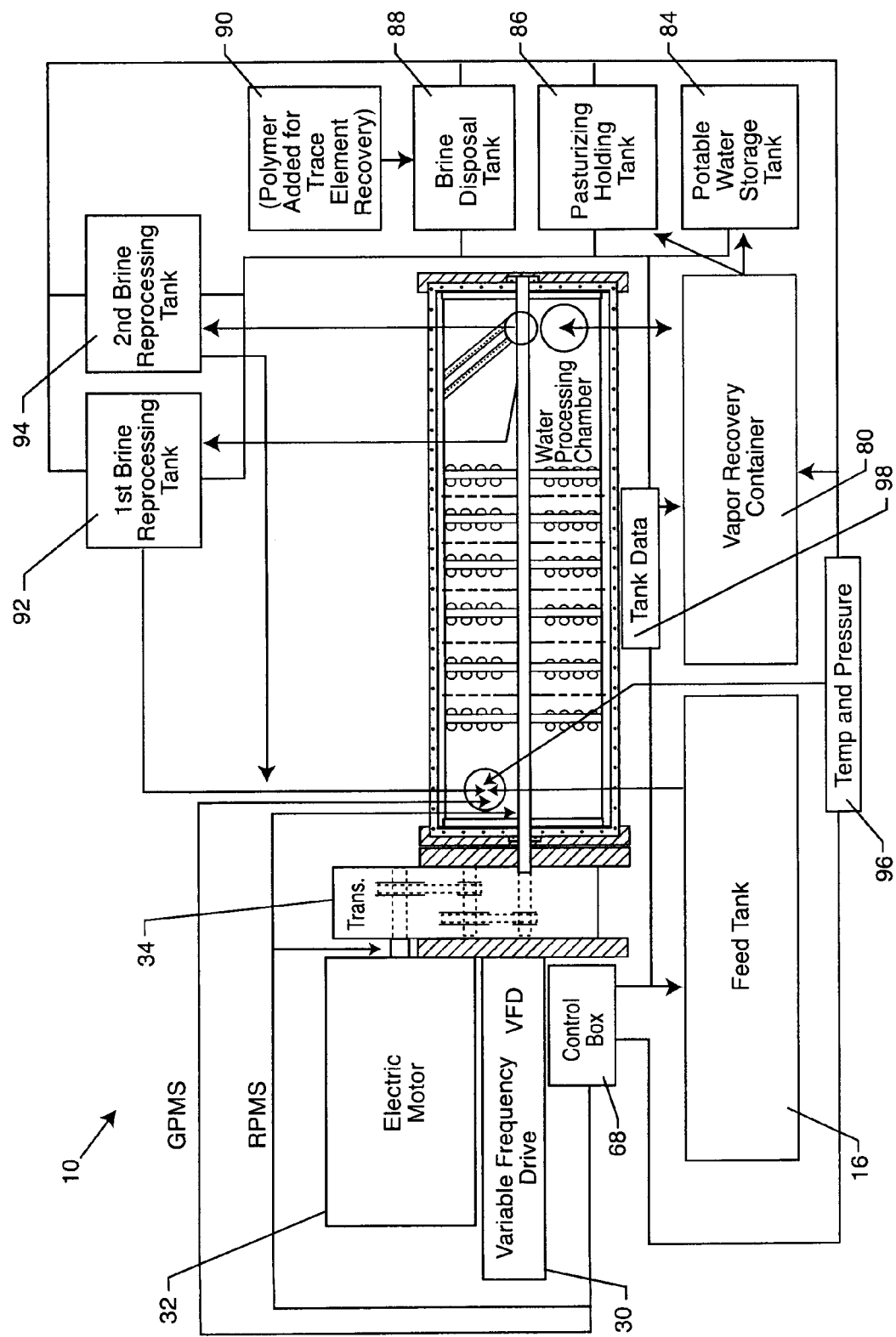
FIG. 11 is a schematic illustration of the system of the present invention, similar to FIG. 1, but illustrating the incorporation of a control box and various sensors, in accordance with the present invention.

With reference now to FIG. 11, in a particularly preferred embodiment, a computer system is integrated into the system 10 of the present invention which regulates the variable frequency drive 30 based on measurements taken from a plurality of sensors that continually read temperature, pressure, flow rate, rotational rates of components and remaining capacity of a variety of tanks connected to the water processing vessel 12. Typically, these readings are taken in real-time.

For example, temperature and/or pressure sensors 96 may be employed to measure the temperature of the water or water vapor within or exiting the vessel 12, as well as the pressure thereof as needed. In response to these sensor readings, the control box 68 will cause the variable frequency drive 30 to maintain the rotational speed of shaft 36, decrease the rotational speed of the shaft 36, or increase the rotational speed of the shaft 36 to either maintain the temperature and pressure, reduce the temperature and pressure, or increase the pressure and temperature, respectively, of the water and water vapor. This may be done, for example, to ensure that the water vapor temperature is at the necessary pasteurization temperature so as to kill all harmful microorganisms and other organisms therein. Alternatively, or in addition to, a sensor may be used to detect the rotational speed (RPMS) of the shaft 36 and/or trays 22 to ensure that the system is operating correctly and that the system is generating the necessary water vapor at a desired temperature and/or pressure. The computerized controller may also adjust the amount of water input through inlet 18 (GPMS) so that the proper amount of water is input as to the amount of water vapor and wastewater which is removed so that the system 10 operates efficiently. The control box 68 may adjust the flow rate of water into the vessel 12, or even adjust the water input.

For example, as indicated above, the contaminated water may come from a feed tank 16, or can be from any other number of tanks, including reprocessing tanks 92 and 94. It is also contemplated that the collected water storage tank could be fluidly coupled to the inlet 18 so as to ensure that the water is purified to a certain level or for other purposes, such as when generating steam which requires a higher purity of water than the contaminated water may provide. As such, one or more sensors 98 may track the data within the tanks to determine water or wastewater/brine levels, concentrations, or flow rates into the tanks or out of the tanks. The controller 68 may be used to switch the input and output of the tanks, such as when the brine is being reprocessed from a first brine reprocessing tank 92 to the second brine reprocessing tank 94, and eventually to the brine disposal tank 88, as described above. Thus, when the first brine reprocessing tank reaches a predetermined level, fluid flow from the feed tank 16 is shut off, and instead fluid is provided from the first brine reprocessing tank 92 into the vessel 12. The treated contaminants and remaining wastewater are then directed into the second brine reprocessing tank 94, until it reaches a predetermined level. Then the water is directed from the second brine reprocessing tank 94 through the system and water processing vessel 12 to, for example, the brine disposal tank 88. Brine water in the first reprocessing tank 92 may be approximately twenty percent of the contaminated water, including most of the total dissolved solids. The residual brine which is finally directed to the brine disposal tank 88 may only comprise one percent of the contaminated water initially introduced into the decontamination system 10 via the feed tank 16. Thus, the temperature and pressure sensors, RPM and flow meters can be used to control the desired water output including water vapor temperature controls that result in pasteurized water.

Figure 12:
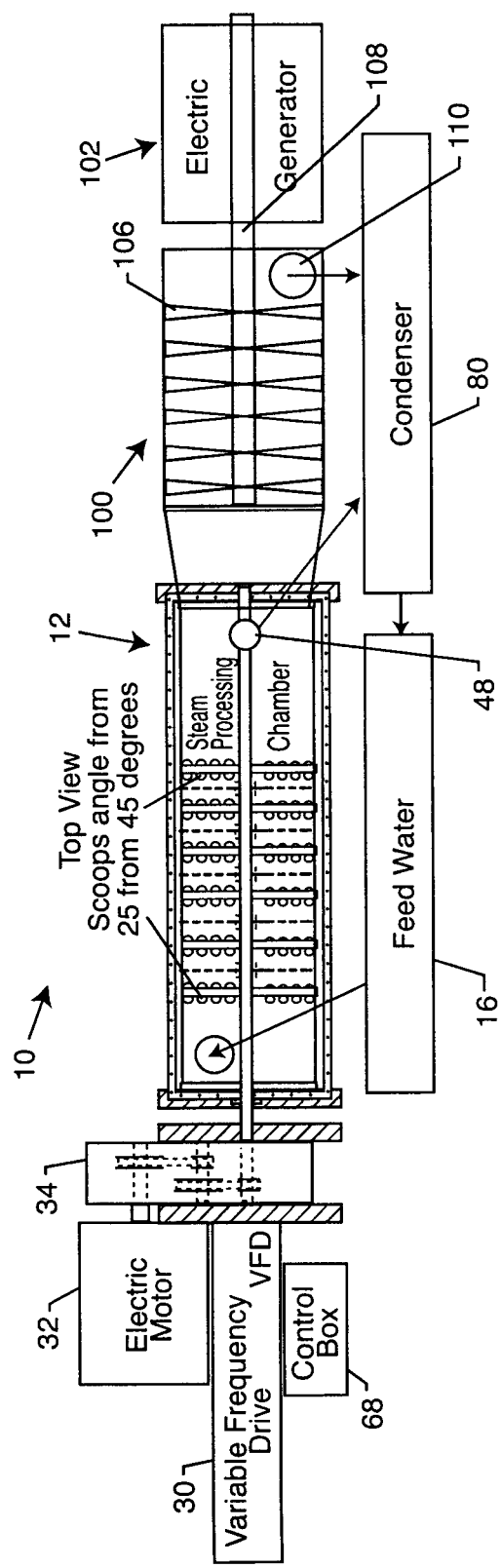
FIG. 12 is a top schematic view of the system of the present invention, incorporating a turbine and electric generator.

The controller 68 can be used to direct the variable frequency drive 30 to power the motor 32 such that the shaft 36 is rotated at a sufficiently high velocity that the rotation of the trays boils the input water and creates steam of a desired temperature and pressure, as illustrated in FIG. 12. FIG. 12 illustrates a steam turbine 100 integrated into the system 10. Water vapor in the form of steam could be generated in the water processing vessel 12 to drive a high pressure, low temperature steam turbine, which is coupled to an electric generator 102, for cost-effective and economical generation of electricity.

Figure 14:
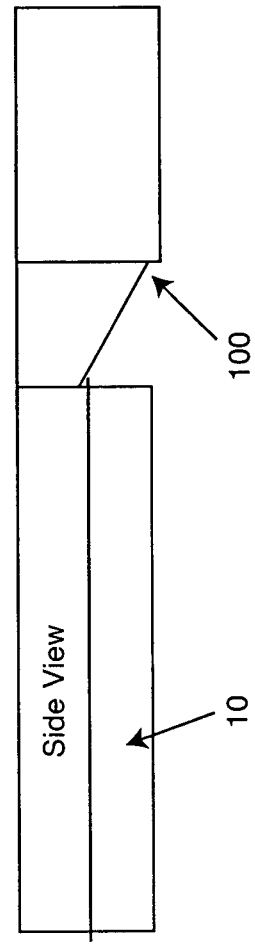
FIG. 14 is a side schematic view of the system of FIG. 12.
Figure 13:
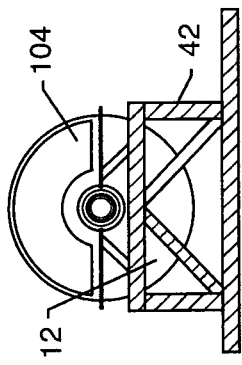
FIG. 13 is an end view of the water processing vessel, illustrating a vapor outlet thereof.

For example, the water vapor can be heated to in excess of six hundred degrees Fahrenheit and pressurized in excess of sixteen hundred pounds per square inch (psi), which is adequate to drive the steam turbine 100. Aside from the increased velocity of the trays, the incorporation of the tapered nature of the scoops 26 of the trays 22, and the tapered nature of the apertures 28 of the aperture plate baffles 24 also facilitate the generation of water vapor and steam. Increasing the angles of the scoops 26, such as from twenty-five degrees at a first tray to forty-five degrees at a last tray, also increases water vapor generation in the form of steam and increases the pressure thereof so as to be able to drive the steam turbine 100. FIGS. 13 and 14 illustrate an embodiment wherein a steam outlet 104 is formed at an end of the vessel 12 and the steam turbine 100 is directly connected thereto such that the pressurized steam passes through the turbine 100 so as to rotate the blades 106 and shaft 108 thereof so as to generate electricity via the electric generator coupled thereto. A water vapor outlet 110 conveys the water vapor to a vapor recovery container 80 or the like. The recovery tank 80 may need to include additional piping, condensers, refrigeration, etc. so as to cool the steam or high temperature water vapor so as to condense it into liquid water.

Of course, it will be appreciated by those skilled in the art that the steam generated by the system 10 can be used for other purposes, such as heating purposes, removal of oil from oil wells and tar and shale pits and the like, etc.

It will also be appreciated that the present invention, by means of the sensors and controller 68 can generate water vapor of a lower temperature and/or pressure for potable water production, which water vapor is directed through outlet 48 directly into a vapor recovery container, and the system sped up to create high temperature water vapor or steam for passage through the steam turbine 100 to generate electricity as needed. For example, during the nighttime hours, the system 10 may be used to generate potable water when very little electricity is needed. However, during the daylight hours, the system 10 can be adjusted to generate steam and electricity.

As described above, many of the components of the present invention, including the variable frequency drive 30, electric motor 32, transmission 34, and water processing vessel 12 and the components therein can be attached to a framework 42 which is portable. The entire system 10 of the present invention can be designed to fit into a forty foot long ISO container. This container can be insulated with a refrigeration (HVAC) unit for controlled operating environment and shipping and storage. The various tanks, including the feed tank, vapor recovery tank, portable water storage tank, and contaminant/brine reprocessing or disposal tanks can either be fit into the transportable container, or transported separately and connected to the inlet and outlet ports as needed. Thus, the entire system 10 of the present invention can be easily transported in an ISO container, or the like, via ship, semi-tractor trailer, or the like. Thus, the system 10 of the present invention can be taken to where needed to address natural disasters, military operations, etc., even at remote locations. Such an arrangement results in a high level of mobility and rapid deployment and startup of the system 10 of the present invention.

Although several embodiments have been described in detail for purposes of illustration, various modifications may be made without departing from the scope and spirit of the invention. Accordingly, the invention is not to be limited, except as by the appended claims.

What is claimed is:
1. A system for decontaminating water and generating water vapor, comprising;
    a vessel having an inner chamber oriented generally horizontally;
    means for introducing a water having contaminates into the inner chamber of the vessel;

means for moving the water through a series of rotating trays alternately separated by stationary baffles;

means for forcing the water through a plurality of scoops through each of the trays, wherein the scoops are configured to have an inlet of a first diameter and an outlet of a second smaller diameter, so as to swirl and heat the water to effect the vaporization thereof to produce a vapor having at least some of the contaminates separated therefrom;

means for directing the water through a plurality of apertures through each of the baffles, wherein the apertures are configured to have an inlet of a first diameter and an outlet of a second smaller diameter;

means for rotating the series of trays at a speed whereby a temperature of the vapor is raised to a pasteurization temperature;

means for removing the vapor from the vessel for condensing apart from the separated contaminates and remaining water;

means for sensing the conditions of at least one of: 1) water input into the vessel, 2) the speed of rotation of the trays, 3) pressure within the vessel, 4) temperature of the water or vapor, or 5) level of separated contaminates; and means for adjusting the speed of rotation of the trays or water input into the vessel in response to the sensed conditions.

2. The system of claim 1, including means for passing the water vapor through a recovery tank having spaced apart members in a flow path of the vapor for condensing to liquid water.

3. The system of claim 1, including means for passing the vapor through a turbine operably connected to an electric generator.

4. The system of claim 3, including means for heating the water to at least a boiling temperature thereof.

5. The system of claim 1, including means for reprocessing the separated contaminates and water by recirculating the separated contaminants and water through the vessel.

6. The system of claim 5, including means for sensing the level of separated contaminates and water in a holding tank or concentration of contaminates in the treated water.

7. The system of claim 1, including means for heating the water to at least 100 degrees Fahrenheit but less than 212 degrees Fahrenheit.

8. The system of claim 1, wherein the plurality of scoops on any one tray in the series of trays are disposed at a smaller angle with respect to the one tray than the plurality of scoops on a previous tray in the series.

9. The system of claim 1, including means for passing a rotatable shaft attached to a drive mechanism through the baffles and the trays such that only the trays rotate.

10. The system of claim 1, including means for directing the flow of water from a central portion of the baffle towards a periphery of the baffle.

11. A system for removing contaminates from water and generating vapor, comprising:

a vessel having an inner chamber oriented generally horizontally;

means for introducing a water having contaminates into the inner chamber of the vessel;

means for moving the water through a series of rotating trays alternately separated by fixed baffles;

means for forcing the water through a plurality of scoops through each of the trays, wherein the scoops are configured to have an inlet of a first diameter and an outlet of a second smaller diameter, so as to swirl and heat the water to effect the vaporization thereof to produce a vapor having at least some of the contaminates separated therefrom due to the rotating of the trays at a sufficient velocity;

means for directing the water through a plurality of apertures through each of the baffles, wherein the apertures are configured to have an inlet or a first diameter and an outlet of a second smaller diameter;

means for rotating the series of trays at a speed whereby a temperature of the vapor is raised to a pasteurization temperature;

means for removing the vapor from the vessel for condensing apart from the separated contaminates and remaining water; and means for reprocessing the separated contaminates and water by recirculating the separated contaminants and water through the vessel.

12. The system of claim 11, including means for sensing the conditions of at least one of: 1) water input into the vessel, 2) the speed of rotation of the trays, 3) pressure within the vessel, 4) temperature of the water or vapor, or 5) level of separated contaminates.

13. The system of claim 12, including means for sensing the level of separated contaminates and water in a holding tank or concentration of contaminates in the treated water.

14. The system of claim 12, including means for, in response to the sensed conditions, adjusting the speed of rotation of the trays or water input into the vessel.

15. The system of claim 11, including means for passing the water vapor through a recovery tank having spaced apart members in a flow path of the vapor for condensing the vapor to liquid water.

16. The system of claim 11, including means for passing the vapor through a turbine operably connected to an electric generator.

17. The system of claim 16, including means for heating the water to at least a boiling temperature thereof.

18. The system of claim 11, including means for heating the water to at least 100 degrees Fahrenheit but less than 212 degrees Fahrenheit.

19. The system of claim 11, wherein the plurality of scoops on any one tray in the series of trays are disposed at a smaller angle with respect to the one tray than the plurality of scoops on a previous tray in the series.

20. The system of claim 11, including means for passing a rotatable shaft attached to a drive mechanism through the baffles and the trays such that only the trays rotate.

21. The system of claim 11, including means for directing the flow of water from a central portion of the baffle towards a periphery of the baffle.

22. A system for generating vapor, comprising:

a vessel having an inner chamber oriented generally horizontally;

means for introducing a water into the inner chamber of the vessel;

means for moving the water through a series of rotating trays alternately separated by stationary baffles;

means for rotating the trays and forcing the water through a plurality of scoops through each of the trays, wherein the scoops are configured to have an inlet of a first diameter and an outlet of a second smaller diameter, the rotating being at a sufficient velocity so as to swirl and heat the water to effect the vaporization of the water to produce a vapor of a predetermined temperature and pressure;

means for directing the water through a plurality of apertures through each of the baffles, wherein the apertures are configured to have an inlet of a first diameter and an outlet of a second smaller diameter;

means for rotating the series of trays at a speed whereby a temperature of the vapor is raised to a pasteurization temperature; and means for passing the vapor through a turbine operably connected to an electric generator.

23. The system of claim 22, including means for separating contaminates in the water from the vapor.

24. The system of claim 23, including means for sensing the conditions of at least one of: 1) water input into the vessel, 2) the speed of rotation of the trays, 3) pressure within the vessel, 4) temperature of the water or vapor, or 5) level of separated contaminates.

25. The system of claim 24, including means for sensing the level of separated contaminates and water in a holding tank or concentration of contaminates in the treated water.

26. The system of claim 24, including means for, in response to the sensed conditions, adjusting the speed of rotation of the trays or water input into the vessel.

27. The system of claim 22, including means for passing the water vapor through a recovery tank having spaced apart members in the flow path of the vapor for condensing the vapor to liquid water.

28. The system of claim 22, including means for heating the water to at least a boiling temperature thereof.

29. The system of claim 22, wherein the plurality of scoops on any one tray in the series of trays are disposed at a smaller angle with respect to the one tray than the plurality of scoops on a previous tray in the series.

30. The system of claim 22, including means for orienting the vessel generally horizontally, and passing a rotatable shaft attached to a drive mechanism through the baffles and the trays such that only the trays rotate.

31. The system of claim 22, including means for directing the flow of water from a central portion of the baffle towards a periphery of the baffle.

* * * * *